United States Patent
Tsuchida et al.

(10) Patent No.: US 6,811,319 B2
(45) Date of Patent: Nov. 2, 2004

(54) OPTICAL CONNECTOR

(75) Inventors: Masahiro Tsuchida, Tokyo (JP); Masaru Kobayashi, Musashino (JP); Yoshiteru Abe, Musashino (JP)

(73) Assignees: Hirose Electric Co., Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 140 days.

(21) Appl. No.: 10/099,712

(22) Filed: Mar. 14, 2002

(65) Prior Publication Data

US 2002/0131718 A1 Sep. 19, 2002

(30) Foreign Application Priority Data

Mar. 15, 2001 (JP) ..................................... 2001-073613

(51) Int. Cl.[7] ............................................... G02B 6/38
(52) U.S. Cl. ............................ 385/55; 385/59; 385/65
(58) Field of Search ........................ 385/55–56, 70–71, 385/76, 83, 95, 97–98, 136, 59, 65

(56) References Cited

U.S. PATENT DOCUMENTS

| 3,885,859 A | | 5/1975 | Dalgleish et al. ......... 350/96 C |
| 3,946,467 A | | 3/1976 | Lukas et al. .................. 24/260 |
| 4,506,946 A | | 3/1985 | Hodge ..................... 350/96.21 |
| 5,155,787 A | * | 10/1992 | Carpenter et al. ............ 385/98 |
| 5,257,334 A | | 10/1993 | Takahashi ..................... 385/65 |
| 5,694,506 A | | 12/1997 | Kobayashi et al. ........... 385/60 |

FOREIGN PATENT DOCUMENTS

| JP | 57139716 | 8/1982 | ............ G02B/7/26 |
| JP | 08292344 | 5/1996 | ............ G02B/6/40 |
| JP | 2001-33659 | 2/2001 | |

* cited by examiner

Primary Examiner—Frank G. Font
Assistant Examiner—Michael P. Mooney
(74) Attorney, Agent, or Firm—Cohen, Pontani, Lieberman & Pavane

(57) ABSTRACT

The present invention provides an optical connector for coupling one optical fiber wire 18 with another optical fiber wire 18' in physical contact. The optical connector comprises a receiving portion 21 including a support region 22 adapted to support the optical fiber wires 18, 18' along the axis of said receiving portion. The axis 24 of the receiving portion is offset from the axis 25 of the optical fiber wire in a posture of being ready to be inserted into the receiving portion 21. When the optical fiber wire 18 is inserted into the receiving portion 21, the inserted optical fiber wire 18 is brought into contact with and bent by a guide region 23, and then the optical fiber wire is slidably moved along the support region 22 of the receiving portion 21. Finally, with keeping the optical fiber wire to be supported by the support region 22, the end of the optical fiber wire 18 is brought into physical contact with the end of another optical fiber wire 18'.

16 Claims, 5 Drawing Sheets

OPTICAL CONNECTOR

FIELD OF THE INVENTION

The present invention relates to an optical connector for coupling one optical fiber wire with another optical fiber wire in physical contact.

BACKGROUND OF THE INVENTION

A method for connecting optical fiber cables includes a so-called physical contact (PC) coupling method for optically coupling optical fiber wires by bringing the end of one optical fiber wire into physical contact with the end of another optical fiber wire. As shown in FIG. 7, a conventional optical connector used in this coupling method comprises a coupling member 2 including a given number of small holes 1. For example, each of the small holes 1 has an inner diameter of 0.126 mm which is slightly larger than the outer diameter, e.g. 0.125 mm, of an optical fiber wire 3. The coupling member 2 is also formed with a guide potion 4 around each periphery of both ends of the small hole 1. The guide portion 4 slants in the direction to widen the small hole 1.

For coupling the optical fiber wires 3, 3' in the above structure, the optical fiber wires 3, 3' each held in a cantilever manner are inserted into the small hole 1 while aligning each of the axes of the optical fiber wires 3, 3' with the axis of the small hole 1 to bring respective one ends of the optical fiber wires 3, 3' into physical contact with each other.

In the conventional optical connector described above, when connecting optical fiber cables, it has been necessary to align the axis of the small hole 1 and the axis of the optical fiber wire 3 with each other. However, the conventional optical connector comes with difficulty aligning the axes with each other because the inner diameter of the small hole 1 is larger than the outer diameter of the optical fiber wire 3 and the optical fiber wire 3 is held in a cantilever manner. This has caused a problem of difficulty in enhancing the coupling accuracy between the optical fiber wires 3, 3'. Further, in order to achieve an optimal alignment between the respective axes, each of associated components is required to have higher dimensional accuracy, resulting in various troubles in manufacturing processes.

SUMMARY OF THE INVENTION

The present invention is directed to solve the above problem. It is therefore an object of the present invention to provide an improved optical connector capable of connecting optical cables readily with enhanced accuracy.

The present invention provides an optical connector for coupling one optical fiber wire with another optical fiber wire in physical contact. The optical connector comprises a receiving portion including a support region adapted to support an optical fiber wire along the axis of the receiving portion. The axis of the receiving portion is offset from the axis of the optical fiber wire in a posture of being ready to be inserted into the receiving portion.

Preferably, the receiving portion includes a guide region which is provided at the end thereof and on an extension of the axis of the optical fiber wire in the posture of being ready to be inserted into the receiving portion. The guide region slants in the direction to widen the receiving portion. Further, the support region may be formed in a V-shaped section.

According to the above structure, when the optical fiber wire is inserted into the receiving portion, the inserted optical fiber wire is brought into contact with and bent by the guide region, and then the optical fiber wire is slidably moved along the support region of the receiving portion. Finally, with keeping the optical fiber wire to be supported by the support region, the end of the optical fiber wire is brought into physical contact with the end of another optical fiber wire.

DESCRIPTION OF THE PREFERRED EMBODIMENT

With reference to drawings, an embodiment of the present invention will now be described.

Figure 1:
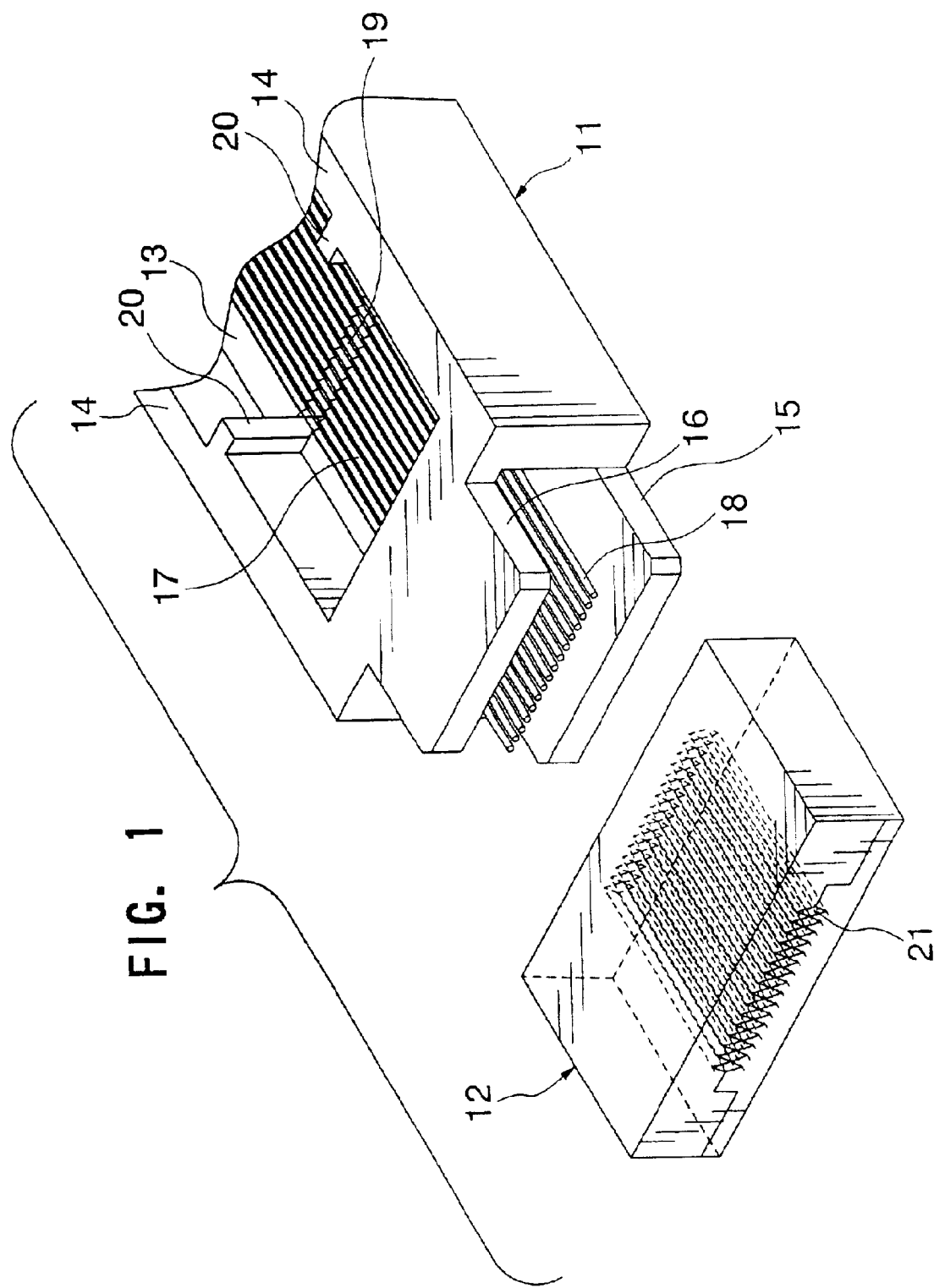
FIG. 1 is a perspective view showing an optical connector according to an embodiment of the present invention.

FIG. 1 shows the major part of an optical connector plug 11, and a coupling member 12 allowing the optical connector plug to be fitted therewith. Generally, the coupling member 12 is attached to an adapter or receptor (not shown).

The optical connector plug 11 comprises a seat 13, a sidewall 14 standing upright from each of both sides of the seat 13 and extending in the direction of the fitting movement of the optical connector plug 11, a bottom plate 15 extending horizontally from the lower end beyond the front end of the seat 13, and a visor-like top plate 16 extending in parallel with the bottom plate 15. The seat 13 has a top surface higher than that of the bottom plate 15. A given number of V-shaped grooves 17 each extending in the direction of the fitting movement of the optical connector plug 11 are formed in the top surface of the seat 13 at even intervals. A plurality of optical fiber wires 18 are arrayed and held by each of the V-shaped grooves 17 one by one with extending each front end of the optical fiber wires beyond the seat 13 in a cantilever manner. An undercut 19 is formed at the approximately center region of the seat 13 in the direction orthogonal to the V-shaped grooves 17. The undercut 19 has a depth greater than that of the V-shaped groove 17. A wing wall 20 is formed on the inner surface of the sidewall 14 at a position corresponding to the undercut 19. Further, a cover plate made of metal (not shown) is provided over the seat 13 on the rear-end side of the undercut 19 to cover the V-shaped grooves 17. Thus, each of the optical fiber wires 18 is sandwiched between the cover plate and the corresponding V-shaped groove 17 and is fixed to the seat 13 with forming an array.

Figure 2:
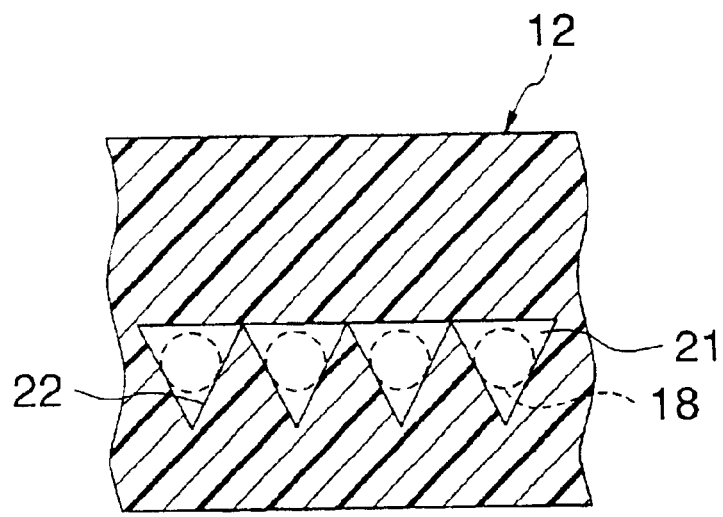
FIG. 2 is a sectional view showing the interior of a small hole according to the embodiment of the present invention.
Figure 3:
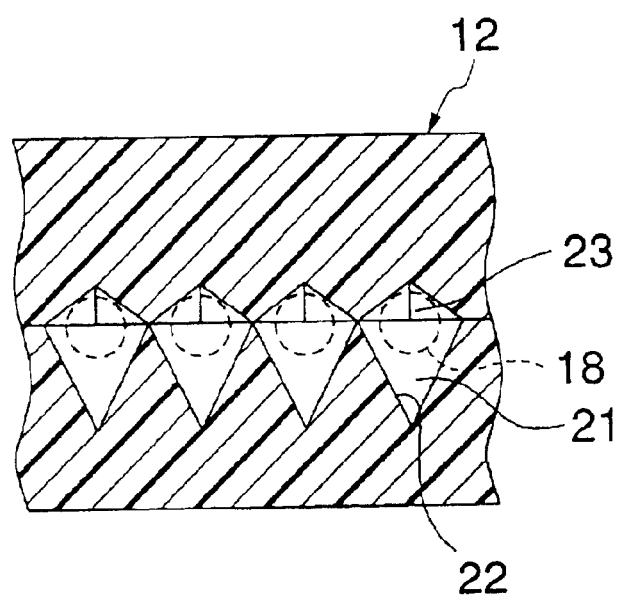
FIG. 3 is a sectional view showing the end of the small holes according to the embodiment of the present invention.

The coupling member 12 is formed in a block or square shape, and is fixed within a housing (not shown) of the adapter or receptor. A given number of small holes 21 are bored in the coupling member 12 to extend in the direction of the fitting movement of the optical connector plug 11 with forming an array laterally. Each axis 24 of the small holes 21 is offset downward from the axis of the corresponding optical fiber wire 18 in a posture of being ready to be inserted into the small hole 21 in question (FIG. 4). Preferably, the small hole 21 is formed in an inverted-triangular-shaped section to provide a support region 22 having a V-shaped section, as shown in FIG. 2. As shown in FIGS. 3 and 4, a guide region 23 is provided at both ends of the small hole 21. The guide region 23 slants upward and outward.

Figure 4A:
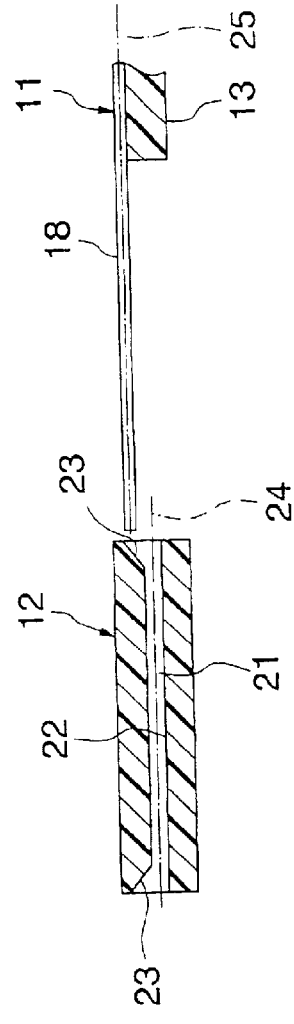
FIG. 4(*a*) is a sectional view showing the state before an optical fiber wire is inserted into a small hole in an embodiment of the present invention, FIG. 4(*b*) is a sectional view showing the state when the optical fiber wire is inserted into the small hole, and FIG. 4(*c*) is a sectional view showing the state when a pair of optical fiber wires has been coupled with each other.
Figure 4B:
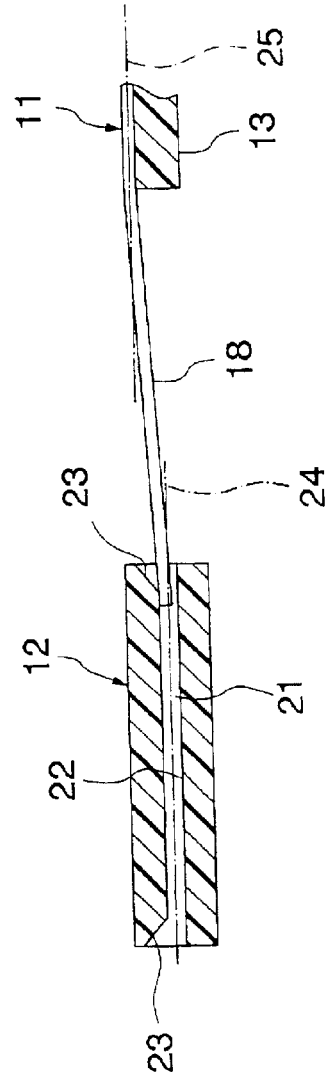
Figure 4C:
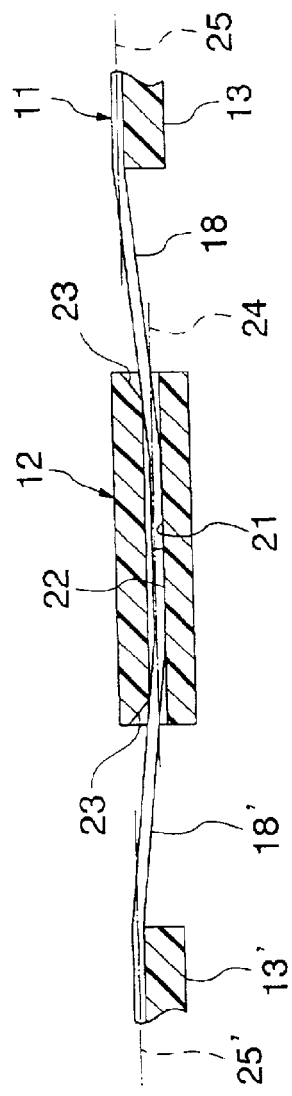

With reference to FIGS. 4(a) to 4(c), the operations in the process of fitting the optical connector plug 11 with the adapter or receptor (not shown) will now be described.

When the optical connector plug 11 is moved from one side (the right side of FIG. 4(a)) to fit with the housing (not shown) of the adapter or receptor, the optical fiber wire 18 held by the seat 13 in a cantilever manner is brought into contact with the inclined surface of the guide region 23, and is thereby bent downward along the guide region 23 as shown in FIG. 4(b). Then, the optical wire 18 bent downward along the guide region 23 is pushed into the support region 22 of the small hole 21, and is slidably moved along the support region 22 to insert the end of the optical fiber wire 18 up to the center region of the small hole 21. At this moment, the coupling member 12 is sandwiched between the bottom plate 15 and the top plate 16 to define the vertical physical relationship between the optical connector plug 11 and the coupling member 12 with reliable accuracy.

When the associated component with which the optical connector plug 11 is fitted is an adapter, another optical fiber wire 18' is also inserted from another side (the left side of FIG. 4) of the coupling member 12 in the same manner as that described above. Otherwise, when the associated component with which the optical connector plug 11 is fitted is a receptor, another optical fiber wire 18' is disposed along the support region 21 in advance. Thus, in any case where the associated component with which the optical connector plug 11 is fitted is the adapter or acceptor, the end of the optical fiber wire 18 is brought into contact with the end of the optical fiber wire 18' with accurate centering or alignment thereof In this manner, the support region 22 acts to guide the optical fiber wires 18, 18' with supporting the optical fiber wires 18, 18' therealong. Thus, the accurate centering or alignment of the optical fiber wires 18, 18' can be achieved readily and reliably.

Figure 5:
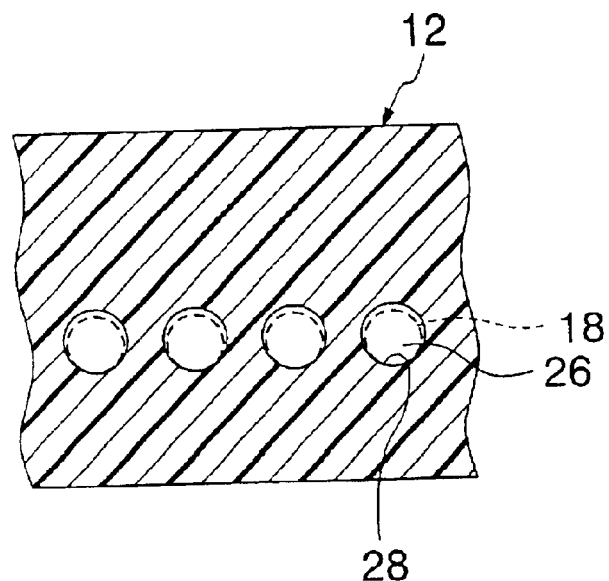
FIG. 5 is a sectional view showing the interior of a small hole according to another embodiment of the present invention.
Figure 6:
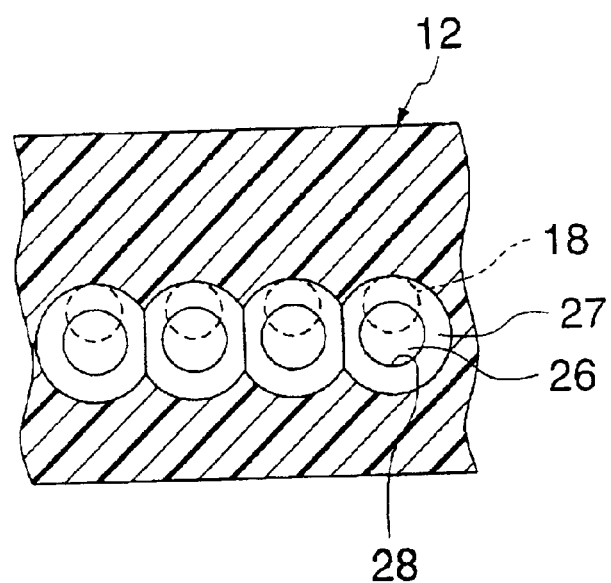
FIG. 6 is a sectional view showing the end of the small hole according to another embodiment of the present invention.
Figure 7:
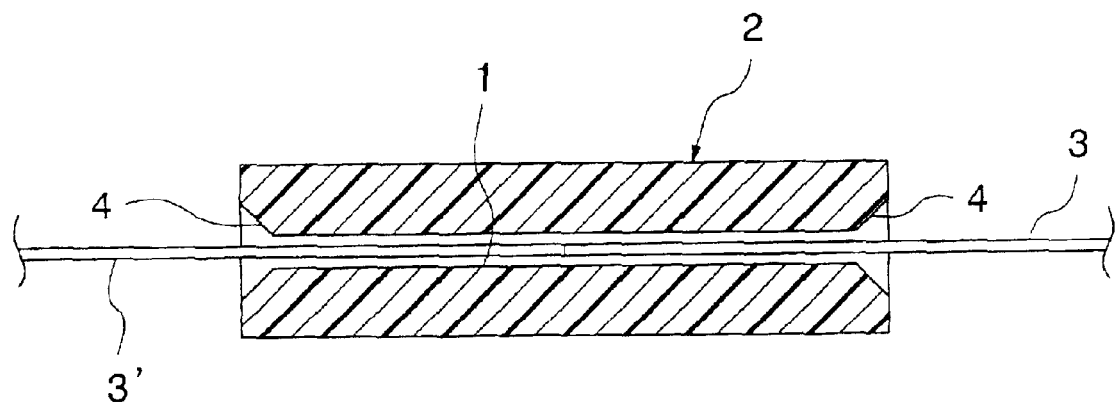
FIG. 7 is a sectional view showing the prior art.

The sectional shape of the small hole 21 is not limited to the aforementioned inverted triangle, and any other suitable shape, such as a circular shape as shown in FIG. 5, may be used. Further, as shown in FIG. 6, a tapered guide region 27 may be provided around each periphery of both ends of the small hole 26. In this case, when the optical fiber wire 18 is inserted into the coupling member 12, the optical fiber wire 18 is brought into contact with and bent by the guide region 27, and is then supported along a curved region (support region) 28 of the lower portion of the small hole 26. Further, the shape of the small hole 21 is not limited to the aforementioned shapes, any other suitable shape capable of serving as a receiving portion having a support region for supporting the optical fiber wire 18 along the axis of the receiving portion may be used. For example, adjacent small holes may be integrally formed by partially connecting them, or the small hole may be partially opened to form a groove.

While the axis 24 of the small hole 21, 26 is offset downward from the axis 25 of the optical fiber wire 18 in the above embodiments, the offset direction may be any one of upward, horizontal and oblique directions.

Further, the position of the guide region 23, 27 is varied depending on the offset direction of the axis 24 of the small hole 21, 26 Thus, the guide region 23, 27 may be provided at any other suitable position (e.g. the right or left side of the small hole 21, 26) located on an extension of the axis 25 of the optical fiber wire 18 in the posture of being ready to be inserted. Further, the guide region 23, 37 is not essential. However, in this case, it is desired to provide a tapered surface or a convex surface in the front end of the optical fiber wire 18.

Further, any other suitable optical connector capable of achieving the physical contact, for example a type having a housing surrounding the outer periphery of the optical connector plug 11, may be used.

Further, it is to be understood that the present invention can be applied to a multipolar connector in which a plurality of optical connecters are seriated in parallel with each other.

As described above, according to the present invention, the coupling of the optical fiber wires are carried out with keeping the optical fiber wires to be supported along the support region of the receiving portion. Thus, accurate centering or alignment of the optical fiber wires can be achieved readily and reliably. Further, the accurate coupling of the optical fiber wires can be achieved without enhancing dimensional accuracy in associated components. This provides various excellent effects on reduction of manufacturing cost and others.

What is claimed is:

1. An optical connector for physically coupling a first plurality of parallel optical fiber wires in respective contact with a second plurality of parallel optical fiber wires, and said first plurality of optical fiber wires defining an axis, said optical connector comprising a plug and coupling member adapted to be fitted with each other;

(a) wherein said plug includes a fitting side engageable with said coupling member;

a seat for supporting said first plurality of optical fiber wires, said seat having a front end;

a bottom plate extending toward said fitting side of said plug beyond said front end of said seat; and a top plate disposed parallel to said bottom plate, and extending toward said fitting side of said plug beyond said front end of said seat;

said first plurality of optical fiber wires being supported between said bottom plate and said top plate toward said fitting side of said plug and cantilevered beyond said front end of said seat; and (b) wherein said a coupling member includes a receiving portion for receiving said first plurality of optical fiber wires, said receiving portion including an axis, a first end, and a support region adapted to support said first plurality of optical fiber wires along said axis of said receiving portion;

said axis of said receiving portion being offset from said axis of said first plurality of optical fiber wires when said first plurality of optical fiber wires is about to be inserted into said receiving portion;

said receiving portion further including a guide region provided at said first end thereof and on an extension of said axis of said first plurality of optical fiber wires when said first plurality of optical fiber wires is about to be inserted into said receiving portion; and said guide region being suitable, when fitting said plug with said coupling member, for contacting said first plurality of optical fiber wires and, as said plug and said coupling member are moved toward each other, to bend and guide said first plurality of optical fiber wires toward said support region;

wherein said bottom plate and said top plate sandwich said coupling member therebetween when said plug and said coupling member are fitted together.

2. The optical connection of claim 1, further comprising a second guide region at a second end of said receiving portion opposite to said first end thereof, said second guide region being suitable for contacting said second plurality of optical fiber wires to bend and guide said second plurality of optical fiber wires toward said seat when fitting said plug with said coupling member.

3. The optical connector of claim 2, wherein said seat further includes a rear end and a top surface having a plurality of grooves, said plurality of grooves being equal in number to said first plurality of optical fiber wires;

each optical fiber of said first plurality of optical fiber wires is disposed within a respective one of said plurality of grooves; and said first plurality of optical fiber wires is fixed to said seat on said rear end of said seat.

4. The optical connector of claim 1, wherein said guide region has a surface inclined toward said support region.

5. The optical connector of claim 4, wherein said seat further includes a rear end and a top surface having a plurality of grooves, said plurality of grooves being equal in number to said first plurality of optical fiber wires;

each optical fiber of said first plurality of optical fiber wires is disposed within a respective one of said plurality of grooves; and said first plurality of optical fiber wires is fixed to said seat on said rear end of said seat.

6. The optical connector of claim 1, wherein said seat further includes a rear end and a top surface having a plurality of grooves, said plurality of grooves being equal in number to said first plurality of optical fiber wires;

each optical fiber of said first plurality of optical fiber wires is disposed within a respective one of said plurality of grooves; and said first plurality of optical fiber wires is fixed to said seat on said rear end of said seat.

7. The optical connector of claim 4, wherein said support region has a V-shaped section.

8. The optical connector of claim 7, wherein said seat further includes a rear end and a top surface having a plurality of grooves, said plurality of grooves being equal in number to said first plurality of optical fiber wires;

each optical fiber of said first plurality of optical fiber wires is disposed within a respective one of said plurality of grooves; and said first plurality of optical fiber wires is fixed to said seat on said rear end of said seat.

9. The optical connection of claim 7, further comprising a second guide region at a second end of said receiving portion opposite to said first end thereof, said second guide region being suitable for contacting said second plurality of optical fiber wires to bend and guide said second plurality of optical fiber wires toward said seat when fitting said plug with said coupling member.

10. The optical connector of claim 9, wherein said seat further includes a rear end and a top surface having a plurality of grooves, said plurality of grooves being equal in number to said first plurality of optical fiber wires;

each optical fiber of said first plurality of optical fiber wires is disposed within a respective one of said plurality of grooves; and said first plurality of optical fiber wires is fixed to said seat on said rear end of said seat.

11. The optical connection of claim 4, further comprising a second guide region at a second end of said receiving portion opposite to said first end thereof, said second guide region being suitable for contacting said second plurality of optical fiber wires to bend and guide said second plurality of optical fiber wires toward said seat when fitting said plug with said coupling member.

12. The optical connector of claim 11, wherein said seat further includes a rear end and a top surface having a plurality of grooves, said plurality of grooves being equal in number to said first plurality of optical fiber wires;

each optical fiber of said first plurality of optical fiber wires is disposed within a respective one of said plurality of grooves; and said first plurality of optical fiber wires is fixed to said seat on said rear end of said seat.

13. The optical connector of claim 1, wherein said support region has a V-shaped section.

14. The optical connector of claim 13, wherein said seat further includes a rear end and a top surface having a plurality of grooves, said plurality of grooves being equal in number to said first plurality of optical fiber wires;

each optical fiber of said first plurality of optical fiber wires is disposed within a respective one of said plurality of grooves; and said first plurality of optical fiber wires is fixed to said seat on said rear end of said seat.

15. The optical connection of claim 13, further comprising a second guide region at a second end of said receiving portion opposite to said first end thereof, said second guide region being suitable for contacting said second plurality of optical fiber wires to bend and guide said second plurality of optical fiber wires toward said seat when fitting said plug with said coupling member.

16. The optical connector of claim 15, wherein said seat further includes a rear end and a top surface having a plurality of grooves, said plurality of grooves being equal in number to said first plurality of optical fiber wires;

each optical fiber of said first plurality of optical fiber wires is disposed within a respective one of said plurality of grooves; and said first plurality of optical fiber wires is fixed to said seat on said rear end of said seat.

* * * * *